United States Patent
Futatsumori

(10) Patent No.: US 12,026,408 B2
(45) Date of Patent: Jul. 2, 2024

(54) IMAGE FORMING APPARATUS WITH SHEET UNIT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yuki Futatsumori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/358,625

(22) Filed: Jul. 25, 2023

(65) Prior Publication Data
US 2024/0028272 A1    Jan. 25, 2024

(30) Foreign Application Priority Data
Jul. 25, 2022   (JP) ................. 2022-118074

(51) Int. Cl.
*G06F 3/12*   (2006.01)

(52) U.S. Cl.
CPC ............ *G06F 3/121* (2013.01); *G06F 3/1204* (2013.01); *G06F 3/1205* (2013.01); *G06F 3/1234* (2013.01); *G06F 3/1255* (2013.01)

(58) Field of Classification Search
CPC ...... G06F 3/121; G06F 3/1204; G06F 3/1205; G06F 3/1234; G06F 3/1255
See application file for complete search history.

(56) References Cited

U.S. PATENT DOCUMENTS

2014/0376028 A1*  12/2014  Tsujita ............... G06K 15/406
                                                  358/1.14
2022/0027691 A1*  1/2022  Iida ....................... G06F 3/1254

FOREIGN PATENT DOCUMENTS

JP     2021-142758 A    9/2021

* cited by examiner

*Primary Examiner* — Quang N Vo
(74) *Attorney, Agent, or Firm* — Venable LLP

(57) ABSTRACT

An image forming apparatus, which is capable of notifying a user of mismatch between sheet types selected in an apparatus body and a print instruction, includes a registration unit that registers sheet types with respect to a sheet unit. The registration unit registers a first sheet type based on a user operation through an operation unit of the image forming apparatus, and a second sheet type based on user operations through the operation unit and an external device that communicates with the image forming apparatus. Notification is performed by one notification method when a sheet type other than the first sheet type is registered and a print instruction using the first sheet type is received. Notification is performed by another notification method when a sheet type other than the second sheet type is registered and a print instruction using the second sheet type is received.

11 Claims, 10 Drawing Sheets

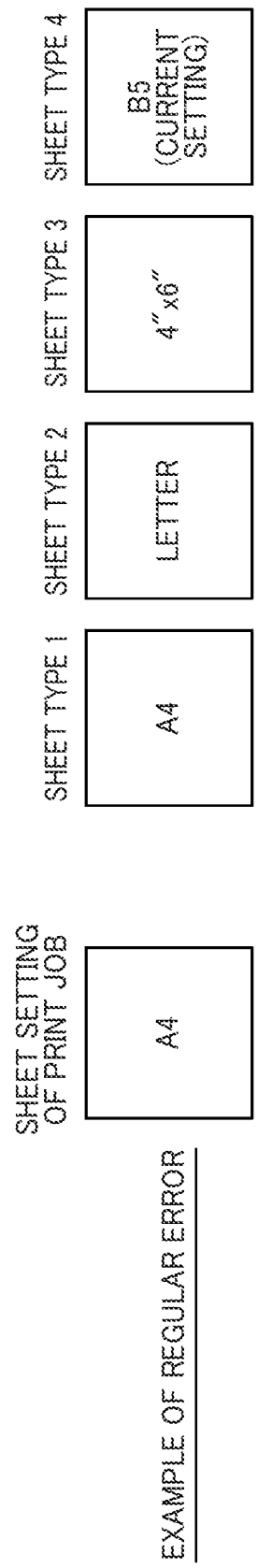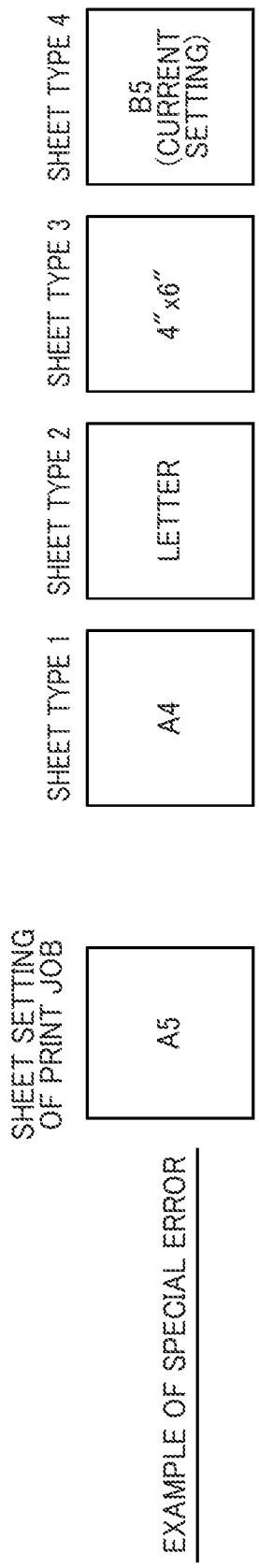

*FIG. 7D*

|  | LAMP FOR APPARATUS-BODY SHEET SETTING | LAMP FOR SHEET SETTING OF PRINT JOB | SHEET CHANGE BUTTON | ERROR LAMP |
|---|---|---|---|---|
| REGULAR ERROR | LIGHT | BLINK | VALID | BLINK (X times/second) |
| SPECIAL ERROR | LIGHT | EXTINGUISH | INVALID | BLINK (Y times/second) |

IMAGE FORMING APPARATUS WITH SHEET UNIT, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus, a control method therefor, and a storage medium storing a control program therefor.

Description of the Related Art

An image forming apparatus is known that includes a detection unit that detects a sheet size of sheets stored in a sheet feed unit and a storage device that stores a sheet type in association with the sheet feed unit. For example, the size of the sheets stored in the sheet feed unit is detected by a sensor, and the detected sheet size is compared with the sheet size indicated by the sheet type set in association with the sheet feed unit. When the detected sheet size and the set sheet size do not match, a warning indicating mismatch of the sheet size is displayed on a display (see, for example, Japanese Laid-Open Patent Publication (Kokai) No. 2021-142758 (JP 2021-142758A)). As a result, a user can change the sheet size stored in association with the sheet feed unit to match the sheet size of the sheets stored in the sheet feed unit, or can replace the sheets stored in the sheet feed unit with sheets of the size in association with the sheet feed unit.

When expressiveness of the display provided in an apparatus body of the image forming apparatus described in the above publication is low, options of the sheet type that can be registered in association with the sheet feed unit are limited. As a technique for dealing with this problem, there is a technique that provides a sheet type registration box that allows a user to arbitrarily check and change the sheet type using an external device such as a remote UI.

However, such an image forming apparatus that requires an external device to change the sheet type is often unable to operate the external device during execution of a print job. Therefore, when an error occurs in which the sheet size designated by the input print job does not match the sheet size registered in association with the sheet feed unit, the user may not be notified of sufficient information for eliminating the error through the display of the apparatus body. As a result, a situation arises in which the user cannot properly handle the occurred error.

SUMMARY OF THE INVENTION

The present invention provides an image forming apparatus that is able to notify a user of mismatch between a sheet type of an apparatus body and a sheet type of a print instruction through a display device included in the apparatus body even if expressiveness of the display device is low.

Accordingly, an aspect of the present invention provides an image forming apparatus including a registration unit configured to register any of a plurality of sheet types including a first sheet type and a second sheet type with respect to a sheet unit for setting sheets, a print unit configured to print an image on a sheet stored in the sheet unit based on a received print instruction, and a notification unit configured to perform predetermined notification based on a sheet type included in the print instruction and the sheet type registered by the registration unit, wherein the first sheet type is registered by the registration unit based on a user operation to an operation unit of the image forming apparatus, and the second sheet type is registered by the registration unit based on a user operation to the operation unit and a user operation to an external device that communicates with the image forming apparatus, wherein the notification unit performs notification in a first notification method in a case where a sheet type other than the first sheet type is registered by the registration unit and a print instruction using the first sheet type is received, and wherein the notification unit performs notification in a second notification method different from the first notification method in a case where a sheet type other than the second sheet type is registered by the registration unit and a print instruction using the second sheet type is received.

The present invention allows the user to be notified of the mismatch between the sheet setting of the apparatus body and the sheet setting of the print data through the display device even if the expressiveness of the display device is low.

Further features of the present invention will become apparent from the following description of exemplary embodiments with reference to the attached drawings.

BRIEF DESCRIPTION OF THE DRAWINGS

FIG. 7A and FIG. 7B are views showing sheet size errors in the first embodiment, FIG. 7D shows examples of error indications.

DESCRIPTION OF THE EMBODIMENTS

Figure 1:
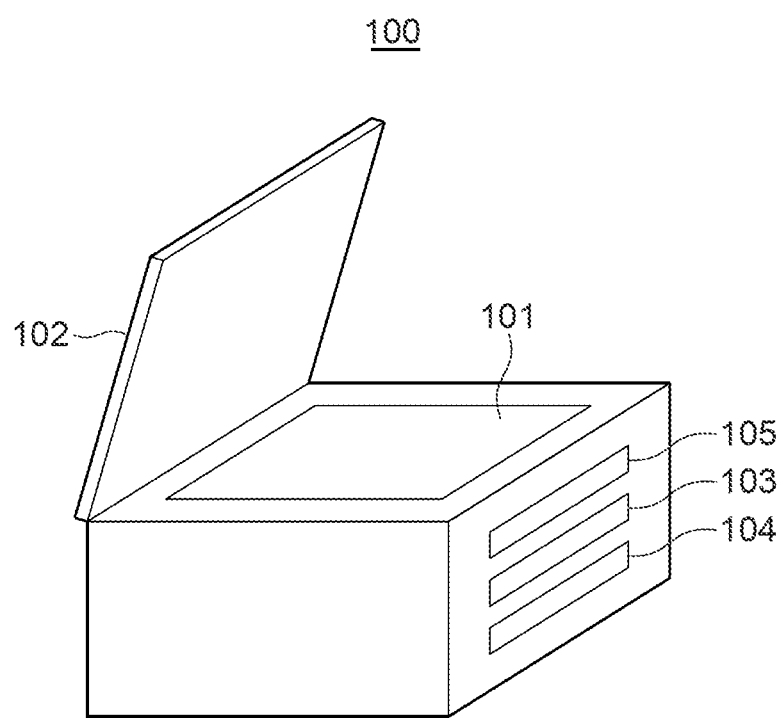
FIG. 1 is an external perspective view showing an image forming apparatus according to embodiments.

Hereafter, embodiments according to the present invention will be described in detail by referring to the drawings.

FIG. 1 is a perspective view schematically showing an appearance of an image forming apparatus 100 according to embodiments. The image forming apparatus 100 is specifically a multifunction peripheral (MFP) having a scanner function, but does not necessarily have to have the scanner function.

The image forming apparatus 100 includes a document positioning plate 101, a plate cover 102, a first sheet feed unit 103, a second sheet feed unit 104, and a discharge tray 105. The platen 101 consists of a transparent plate glass, and is used when a document placed thereon is read by a scanner.

The platen cover 102 prevents light irradiating a document from leaking to outside when the document is read by the scanner.

Various size sheets can be set (stacked and stored) in the first sheet feed unit 103 and the second sheet feed unit 104. The sheets set in the first sheet feed unit 103 and the second sheet feed unit 104 are conveyed one by one to a print unit (not shown) provided inside the image forming apparatus 100. The conveyed sheet is subjected to a print process in the print unit and then discharged to the discharge tray 105. Although this embodiment shows the configuration that includes two sheet feed units, the number of sheet feed units may be any number as long as the number is one or more.

Figure 2:
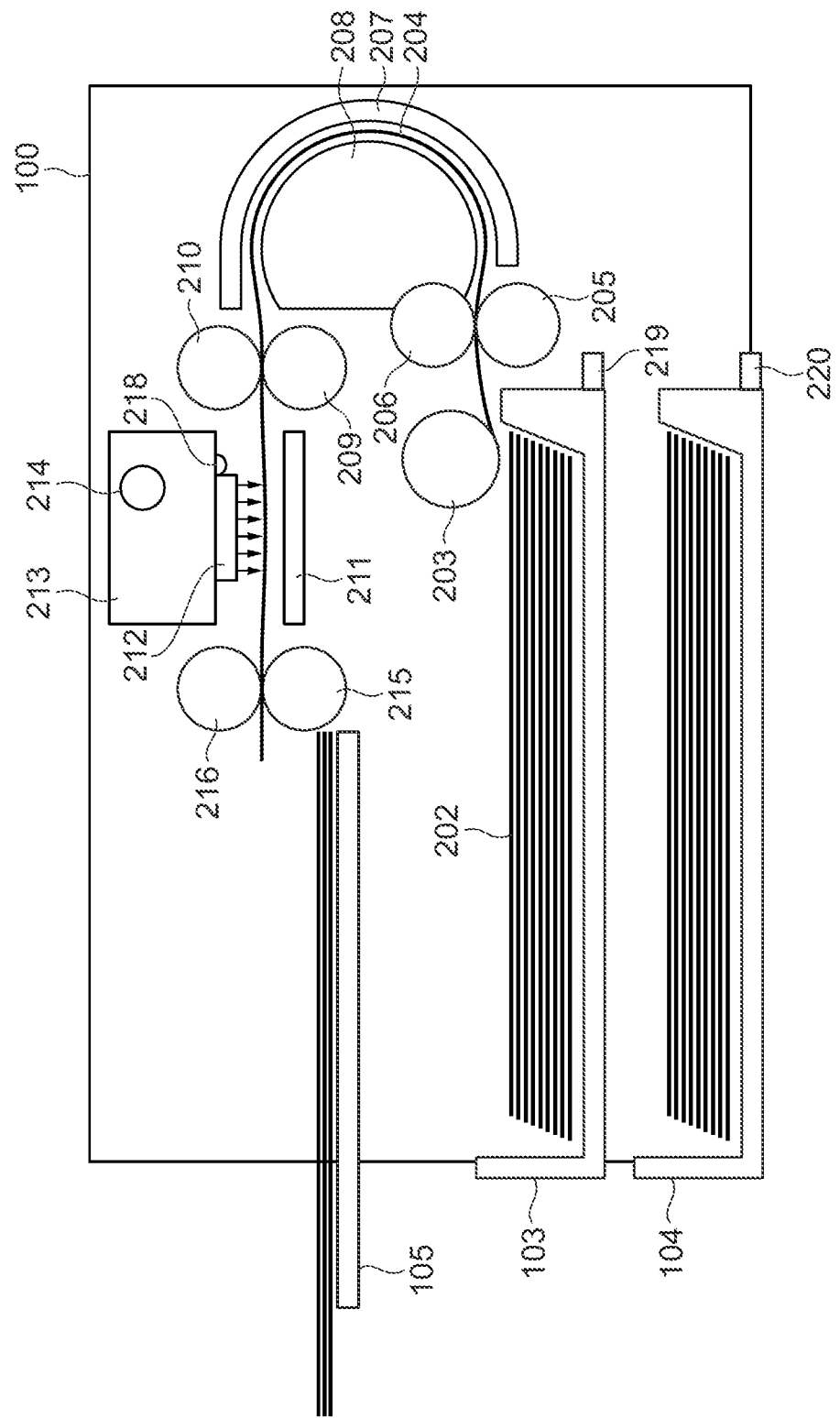
FIG. 2 is a schematic view showing an internal configuration of the image forming apparatus.

FIG. 2 is a schematic view showing an internal configuration of the image forming apparatus 100. FIG. 2 shows a configuration related to feeding of a sheet and image formation on the sheet, and optical or mechanical elements, such as the document positioning plate 101, the plate cover 102, and a scanner 325 (see FIG. 3) for reading a document, are not shown.

The first sheet feed unit 103 is provided with a first cassette sensor 219 that detects insertion and removal of a sheet feed cassette into and from the first sheet feed unit 103. The second sheet feed unit 104 is provided with a second cassette sensor 220 that detects insertion and removal of a sheet feed cassette into and from the second sheet feed unit 104.

Sheets 202 stacked on the first paper feed unit 103 are picked up by a sheet feed roller 203 driven by a conveyance motor 310 (see FIG. 3) and fed to conveyance rollers 205 and 206. A sheet 204 that is fed from the first sheet feed unit 103 is fed by the conveyance rollers 205 and 206 to a conveying path formed by members 207 and 208, conveyed in a U-turn, and then fed to conveyance rollers 209 and 210. Similar to the sheets 202 stacked on the first sheet feed unit 103, sheets stacked on the second sheet feed unit 104 are also fed to the conveying path consisting of the members 207 and 208 by a sheet feed roller (not shown) and the conveyance rollers 205 and 206, and then fed to the conveyance rollers 209 and 210.

The conveyance rollers 209 and 210 convey the sheet 204 onto a platen 211. A carriage 213 on which a print head 212 is mounted is disposed at a position facing the platen 211 across the sheet 204. The carriage 213 is reciprocated by a carriage motor 311 (see FIG. 3) along a guide rail 214 provided so as to be substantially parallel to the upper surface of the platen 211 and to extend in a direction orthogonal to the conveyance direction of the sheet 204 on the platen 211. An image is formed (printed) on the sheet 204 by applying a driving pulse to the print head 212 during the reciprocating motion of the carriage 213.

The carriage 213 is provided with a sheet sensor 218 having a reflective optical sensor. The image forming apparatus 100 can detect whether the sheet 204 is on the platen 211 based on an output level of the sheet sensor 218. Further, an edge of the sheet 207 that is conveyed on the platen 211 can be detected by obtaining the output level of the sheet sensor 218 while moving the carriage 213.

The sheet 204 on which the image is formed is delivered from the conveyance rollers 209 and 210 to discharge rollers 215 and 216 provided on a downstream side in the conveyance direction across the platen 211, and is then discharged to the discharge tray 105 by the discharge rollers 215 and 216 and stacked.

Figure 3:
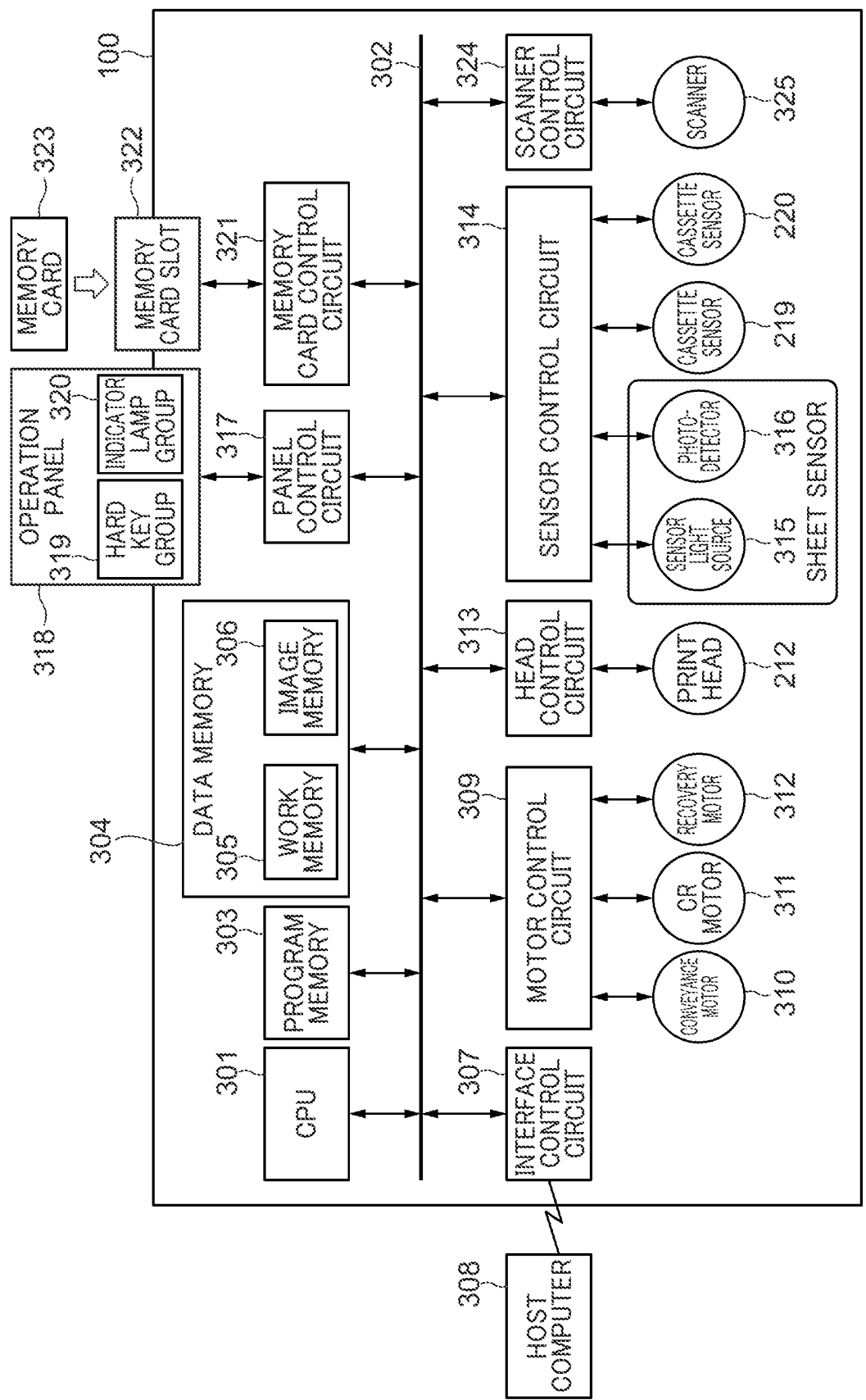
FIG. 3 is a block diagram showing a configuration of a control system of the image forming apparatus.

FIG. 3 is a block diagram showing a configuration of a control system of the image forming apparatus 100. The image forming apparatus 100 includes a CPU 301, a program memory 303, a data memory 304 having a work memory 305 and an image memory 306, a panel control circuit 317, and a memory card control circuit 321. The image forming apparatus 100 also includes an interface control circuit 307, a motor control circuit 309, a head control circuit 313, a sensor control circuit 314, and a scanner control circuit 324. These devices included in the image forming apparatus 100 are communicably connected to each other via an internal bus 302. The image forming apparatus 100 further includes an operation panel 318 having a hardkey group 319 and an indicator lamp group 320, a memory card slot 322, a conveyance motor 310, a carriage motor 311, a recovery motor 312, a print head 212, and the scanner 325. The image forming apparatus 100 includes the sheet sensor 218 having a sensor light source 315 and a photodetector 316, the first cassette sensor 219, and the second cassette sensor 220.

The CPU 301 controls the overall operations of the image forming apparatus 100 by deploying a program stored in the program memory 303 to the work memory 305 of the data memory 304 and controlling each section of the image forming apparatus 100. A ROM is used for the program memory 303. Here, the ROM includes a rewritable memory, such as an EEPROM, and the program memory 303 stores various parameters and information necessary for the operation (control) of the image forming apparatus 100. For example, a sheet type is stored into the program memory 303 and is rewritten as described below with reference to FIG. 6. A RAM is used for the data memory 304. The work memory 305 is used for executing (developing) a program by the CPU 301. The image memory 306 temporarily stores the image data formed on the sheet, the image data read by the scanner 325, etc.

The CPU 301 controls the interface control circuit 307 to send and receive data to and from an external device connected via an external interface (not shown). In FIG. 3, a host computer 308 is shown as an example of the external device.

For example, the CPU 301 receives data of a print job from the host computer 308, and sends a status of the image forming apparatus 100 and the information stored in the memory card 323 to the host computer 308. The external device is not limited to the host computer 308, and may be a smartphone or the like.

The CPU 301 controls driving of the conveyance motor 310, the carriage motor 311 (denoted as "CR motor" in FIG. 3), and the recovery motor 312 via the motor control circuit 309. The conveyance motor 310 drives the sheet feed roller 203, the conveyance rollers 205, 206, 209, and 210, and the discharge rollers 215 and 216 to convey the sheet from the first sheet feed unit 103 or the second sheet feed unit 104 to the discharge tray 105.

The carriage motor 311 drives the carriage 213 to reciprocate. The recovery motor 312 drives a head recovery mechanism (not shown) that performs a recovery operation for appropriately maintaining the state of the print head 212 in synchronization with the driving of the carriage 213. The CPU 301 controls the driving of the print head 212 via the head control circuit 313 in synchronization with the reciprocating motion of the carriage 213 so as to form an image on the sheet.

The CPU 301 controls light emission of the sensor light source 315 of the sheet sensor 218 via the sensor control circuit 314 and obtains signals (voltage signals) output from the photodetector 316. Each of the first cassette sensor 219 and the second cassette sensor 220 includes a photo interrupter and a mechanical switch. The first cassette sensor 219 detects insertion and removal of the sheet feed cassette in the first sheet feed unit 103. Also, the second cassette sensor 220 detects insertion and removal of the sheet feed cassette in the second sheet feed unit 104. Detection results (outputted signals) from the sensors 219 and 220 are sent to the CPU 301 via the sensor control circuit 314.

It should be noted that the first sheet feed unit 103 and the second feed unit 104 do not include a sensor for detecting the size of the sheets stacked on the sheet feed cassette when the sheet feed cassette is mounted. This is because a sensor for detecting the size of the sheets is not necessarily required and the apparatus cost can be reduced as a result of the fact that it is possible to prompt the user to take an appropriate action in response to an error notification when the sheet size error occurs, which will be described later.

The CPU 301 receives an operation on the hardkey group 319 of the operation panel 318 (not shown in FIG. 1) provided on the outer surface of the apparatus body of the image forming apparatus 100 via the panel control circuit 317, and controls lighting, blinking, and extinction of the indicator lamp group 320. Details of the indicator lamp group 320 will be described later with reference to FIG. 4A and FIG. 4B.

The CPU 301 controls the scanner 325 via the scanner control circuit 324. The scanner 325 optically reads a document placed on the document positioning plate, and the CPU 301 generates image data of the read image. The CPU 301 reads and writes various kinds of data from and to the memory card 323 attached to the memory card slot 322 provided on the outer surface of the image forming apparatus 100 via the memory card control circuit 321. The image data read by the scanner 325 is stored in the image memory 306 and then transmitted to the host computer 308 or saved as an image file in the memory card 323. Further, a copy function can be achieved by printing the image read by the scanner 325 as-is by the print unit.

Figure 4A:
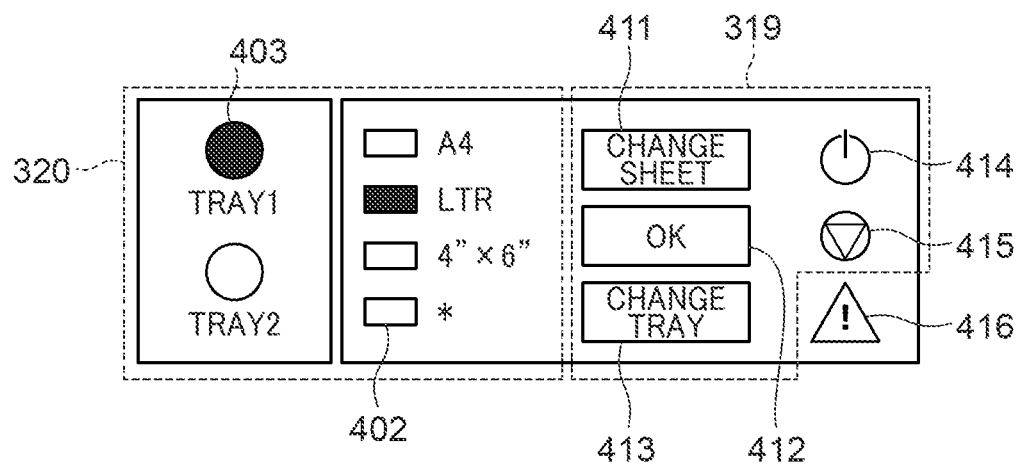
FIG. 4A is a view showing an example of an operation panel of the image forming apparatus.

FIG. 4A shows an example of the operation panel 318. The indicator lamp group 320 of the operation panel 318 includes feed-unit selection lamps 403, sheet selection lamps 402, and an error lamp 416. The feed-unit selection lamps 403 are indicators that indicate the selection status of the sheet feed unit. A "TRAY 1" in FIG. 4A indicates the first sheet feed unit 103 and a "TRAY 2" indicates the second sheet feed unit 104.

The sheet selection lamps 402 are light emission units that indicate the selected sheet type in the selected sheet feed unit so as to be distinguishable from the other sheet types. The error lamp 416 is a light emission unit that notifies the user of occurrence of an error in the image forming apparatus 100 by lighting or blinking, and is a notification unit that issues a warning, that is, a warning lamp. For example, LEDs are used as light sources of the feed-unit selection lamps 403, the sheet selection lamps 402, and the error lamp 416.

The hardkey group 319 of the operation panel 318 includes a sheet change button 411, an OK button 412, a tray change (feed change) button 413, a power button 414, and a cancel button 415.

Figure 4B:
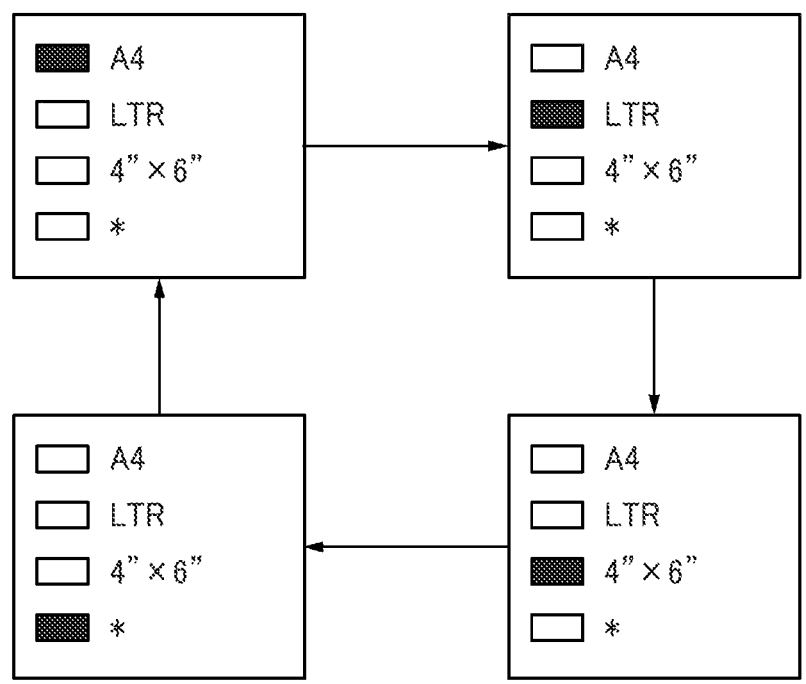
FIG. 4B is a view showing changes in a lighting position of sheet selection lamps.

The sheet change button 411 is an operation member for changing a sheet setting of the currently selected sheet feed unit in the apparatus body of the image forming apparatus 100 (hereinafter referred to as an "apparatus-body sheet setting"). FIG. 4B is a view schematically showing changes in the lighting position of the sheet selection lamps 402 in response to the pressing of the sheet change button 411. In FIG. 4B, a lighting state of a sheet selection lamp is indicated by a black square, an extinction state is indicated by a white square (frame), and the lighting state (black square) indicates that the corresponding sheet is selected. As shown in FIG. 4B, whenever the sheet change button 411 is pressed, the lighting position of the sheet selection lamps 402 changes. Although the lighting position of the sheet selection lamps 402 moves downwardly (but moves from the bottom to the top after the lowermost position is reached) whenever the sheet change button 411 is pressed in FIG. 4B, the changing order of the lighting position is not limited to this.

The tray change button 413 is an operation member for changing the sheet feed unit that supplies a sheet to the print unit between the first sheet feed unit 103 and the second sheet feed unit 104. In FIG. 4A, a lighting state of a feed-unit selection lamp is indicated by a black circle and an extinction state is indicated by a white circle, and the state in which the first sheet feed unit 103 is selected is shown in FIG. 4A. The lighting position of the feed-unit selection lamps 403 is changed whenever the change button 413 is pressed (not shown). If an image forming apparatus has only one sheet feed unit, the tray change button 413 and the feed-unit selection lamps 403 are not necessary.

The OK button 412 is an operation member for fixing the sheet selection state. The power button 414 is an operation member for switching on/off of the power of the image forming apparatus 100. The cancel button 415 is an operation member for canceling a print job or a scan job that the image forming apparatus 100 is executing.

Figure 5:
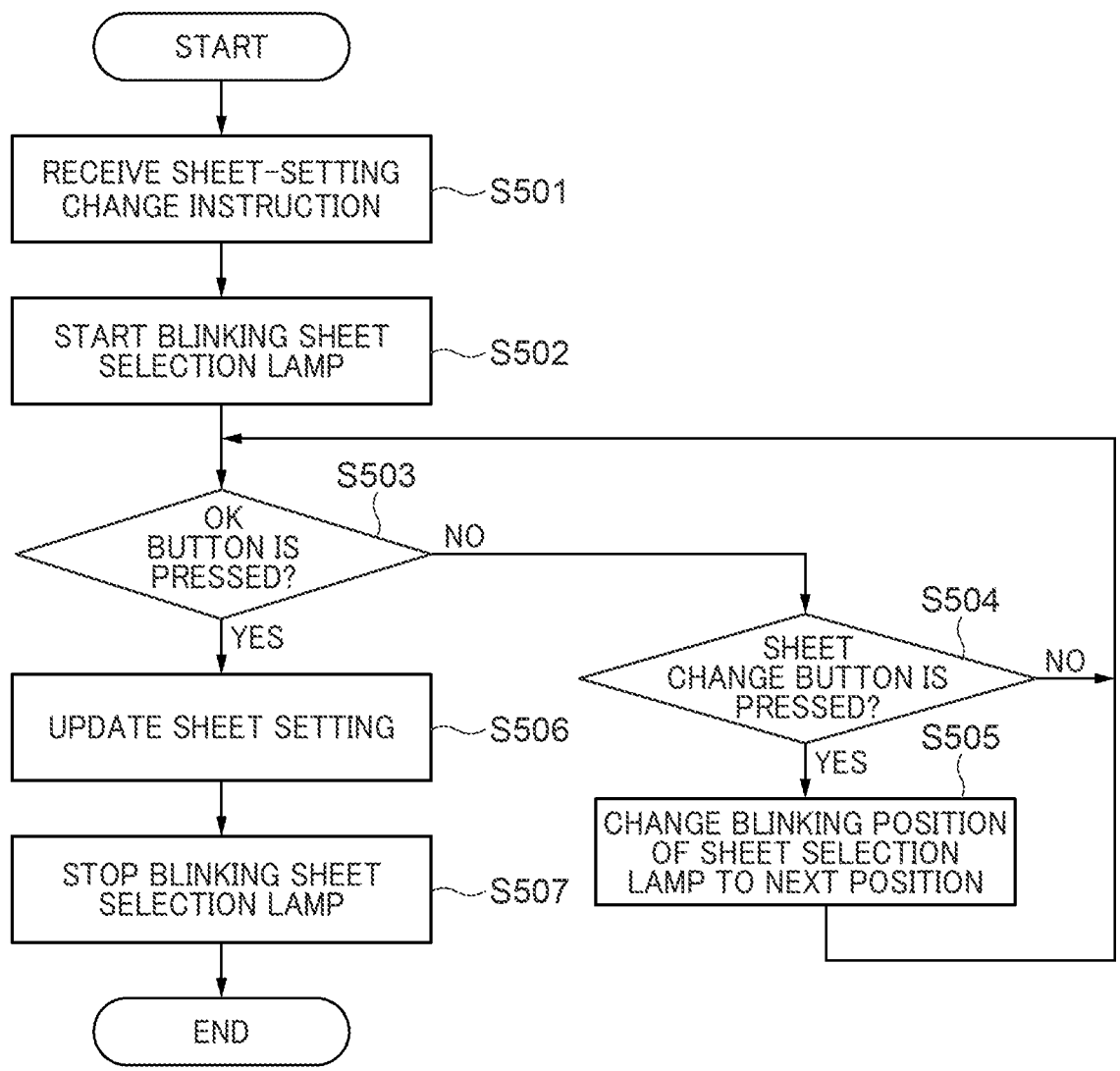
FIG. 5 is a flowchart showing a sheet type switching process in a first embodiment.

FIG. 5 is a flowchart showing a sheet setting change process executed by the image forming apparatus 100. Each process (step) indicated by an S number in FIG. 5 is achieved when the CPU 301 loads a predetermined program stored in the program memory 303 into the work memory 305 and controls the operation of each unit of the image forming apparatus 100.

In S501, the CPU 301 receives a sheet-setting change instruction. The sheet-setting change instruction occurs when the first sheet feed unit 103 or the second sheet feed unit 104 is detached or attached, or when a user presses the sheet change button 411, for example. Here, the sheet change button 411 shall be pressed in a state where the first sheet feed unit 103 is selected as the sheet feed unit or the sheet feed cassette shall be attached to or detached from the first sheet feed unit 103. The same process is performed even when the second sheet feed unit 104 is a target.

In S502, the CPU 301 starts blinking the sheet selection lamp 402. As a result, the user is notified that the sheet setting can be changed. In other words, the user can recognize that the sheet setting can be changed by confirming the blinking of the sheet selection lamp 402.

In S503, the CPU 301 determines whether the OK button 412 is pressed. When it is determined that the OK button 412 is not pressed (NO in S503), the CPU 301 executes a process in S504. In S504, the CPU 301 determines whether the sheet change button 411 is pressed. When it is determined that the sheet change button 411 is not pressed (NO in S504), the CPU 301 returns the process to S503. When it is determined that the sheet change button 411 is pressed (YES in S504), the CPU 301 executes a process in S505. In S505, the CPU 301 changes the blinking position of the sheet selection lamps 402 and then returns the process to S503. By the process in S503 to S505, the sheet selection lamp 402 corresponding to the sheet size desired by the user blinks.

When it is determined that the OK button 412 is pressed in S503 (YES in S503), the CPU 301 executes a process in S506. In S506, the CPU 301 updates the sheet setting of the first sheet feed unit 103 by storing the sheet type corresponding to the sheet selection lamp 402 that is blinking in the data memory 304. The CPU 301 stops blinking the sheet selection lamp 402 to shift to the lighting state in S507, and finishes this process.

A sheet type change process in the image forming apparatus 100 will now be described. In this embodiment, a plurality of registration boxes (four registration boxes) for the sheet types are provided for each of the first sheet feed unit 103 and the second sheet feed unit 104. There is no difference in the sheet type change process between the first sheet feed unit 103 and the second sheet feed unit 104.

Figure 6B:
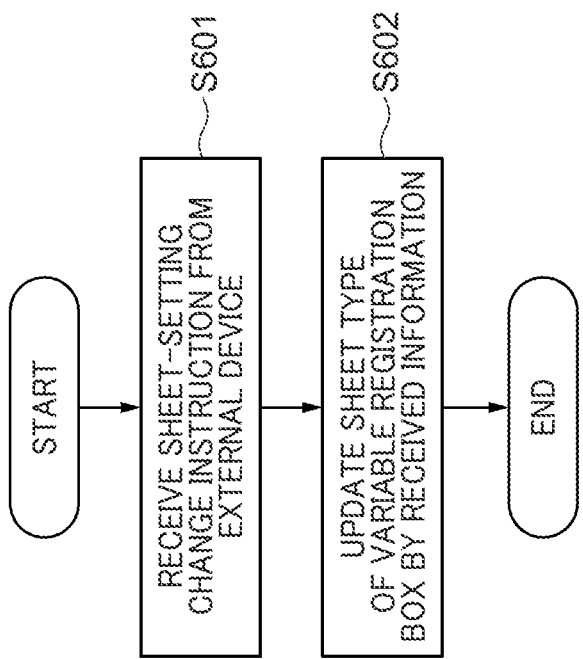
FIG. 6B is a flowchart showing a sheet type change process.
Figure 6A:
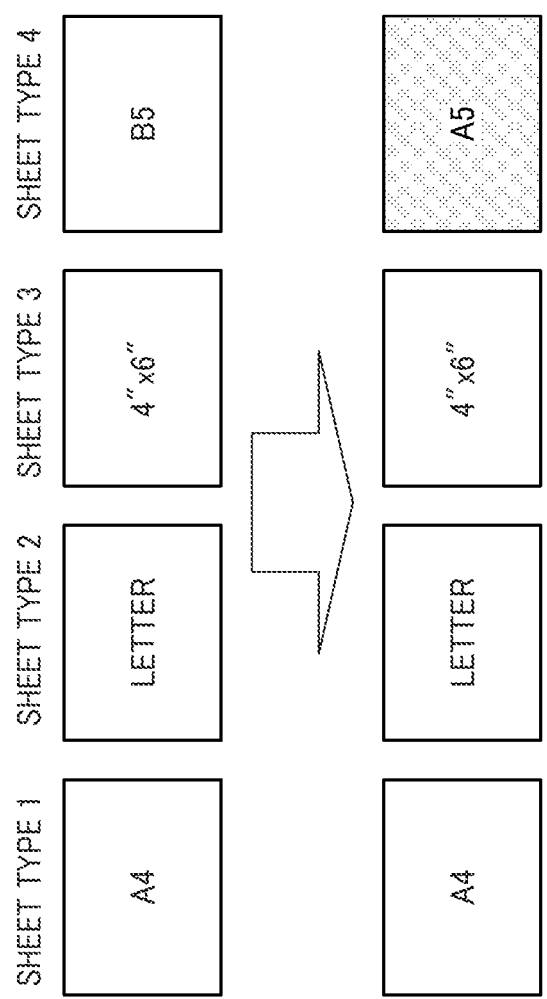
FIG. 6A is a view showing a registration change example of the sheet type in the first embodiment.

FIG. 6A schematically shows registration states of the sheet types in the four registration boxes before and after the sheet type change process. Among the sheet types 1 through 4 that can be registered in the four registration boxes, only the sheet type 4 shall be changeable by a user, and the sheet types 1 through 3 shall not be changeable. Hereinafter, the registration box in which the sheet type 4 is registered is referred to as a "variable registration box", and the registration boxes in which the sheet types 1 through 3 are registered are referred to as "standard registration boxes".

It should be noted that B5 size shall be registered as a default setting in the variable registration box in shipping the image forming apparatus 100 as a product. However, the default setting of the variable registration box is not limited to the B5 size and can be set in accordance with the use of the image forming apparatus 100 as a product at a shipping destination.

The sheet types registered in the standard registration boxes are the same for the first sheet feed unit 103 and the second feed unit 104 in this embodiment for convenience of description, as shown in FIG. 6A. The number of the standard registration boxes is not limited to three and the number of variable registration box is not limited to one. The image forming apparatus 100 includes at least one standard registration box and at least one variable registration box for each sheet feed unit.

FIG. 6B is a flowchart showing the sheet type change process in the image forming apparatus 100. Each process (step) indicated by an S number in FIG. 6B is achieved when the CPU 301 loads a predetermined program stored in the program memory 303 into the work memory 305 and controls the operation of each unit of the image forming apparatus 100. The sheet type change process is similarly performed to the first sheet feed unit 103 and the second sheet feed unit 104.

In S601, the CPU 301 receives a sheet-setting change instruction from the external device (the host computer 308 in the configuration in FIG. 3) to change the sheet type to be registered in the variable registration box. This change instruction includes a sheet type parameter after change. The CPU 301 updates the sheet type in the variable registration box by storing the sheet type received in S601 in the program memory 303 in S602, and then finishes the process.

FIG. 6A shows an example in which the sheet type 4 of the variable registration box is updated to A5 size as a result of designation of the A5 size as the sheet type. The user changes the state so as to light the sheet selection lamp 402 corresponding to an asterisk in FIG. 4 by operating the sheet change button 411. Then, the apparatus-body sheet setting becomes the A5 size. The image forming apparatus 100 may be configured such that the apparatus-body sheet setting is automatically changed to the variable registration box in response to the change of the sheet type of the variable registration box without requiring the operation of the sheet change button 411.

FIG. 7A and FIG. 7B respectively show two aspects of sheet size errors in which the apparatus-body sheet setting does not match the sheet setting of the print job. For convenience of description, sheets of B5 size are stacked (stored) in each of the first sheet feed unit 103 and the second sheet feed unit 104. In addition, it shall be set that sheets are fed from the first sheet feeding unit 103 (the feed-unit selection lamp 403 corresponding to the tray 1 lights), and the apparatus-body sheet setting (setting before a print job is input) shall be set to the B5 size (the sheet type 4).

In the first sheet size error, the sheet setting of the print job is A4 size. In this case, the user may replace the sheets of the B5 size in the first sheet feed unit 103 with the sheets of the A4 size and may change the apparatus-body sheet setting to the A4 size by operating the sheet change button 411. As a result, the sheet setting of the print job can match the apparatus-body sheet setting, and the error can be eliminated. Although the sheet size error occurs when the apparatus-body sheet setting is the sheet type 2 or the sheet type 3, the sheet size error can be eliminated by operating the sheet change button 411 also in this case. The sheet size error that can be eliminated by replacing the sheets in the sheet feed unit and changing the apparatus-body sheet setting is referred to as a "regular error".

In the meantime, in the second sheet size error, the sheet setting in the print job is the A5 size. In this example, the A5 size is not registered as the sheet types 1 through 4 for any of the first sheet feed unit 103 and the second sheet feed unit 104 in the image forming apparatus 100. Therefore, even if the user stacks A5 size sheets on the sheet feed unit, the error cannot be canceled by operating the sheet change button 411 and the tray change button 413. In this way, the sheet size error that cannot be resolved by an operation on the operation panel 318 in the image forming apparatus 100 is referred to as a "special error".

If the B5 size sheets are stacked on the first sheet feed unit 103 or if the A4 size sheets are stacked on the second sheet feed unit 104 and the sheet type 1 is set, no error will occur or an error can be manually resolved. That is, when the image forming apparatus 100 is configured to automatically select a sheet feed unit in response to the sheet setting of the print job, the automatic selection of the second sheet feed unit 104 will not result in the sheet size error. In the meantime, when the image forming apparatus 100 does not have an automatic selection function of the sheet feed unit, the feed-unit selection lamp 403 and the sheet selection lamp 402 corresponding to the A4 size are blinked to notify the user of error notification for prompting the user to operate the tray change button 413 and the sheet change button 411. In response to this, when the user operates the tray change button 413 to select the second sheet feed unit 104 and operates the sheet change button 411 to change the apparatus-body sheet setting to the A4 size, the error can be canceled. The error in this case is the regular error because the error can be canceled by changing the apparatus-body sheet setting.

When the A4 size sheets are stacked on the first sheet feed unit 103 but the B5 size of the variable registration box is erroneously set in the image forming apparatus 100, the regular error occurs. In this case, the sheet selection lamp 402 corresponding to the A4 size is blinked to prompt the user to operate the sheet change button 411. When the apparatus-body sheet setting is changed by a user operation in response to this, the error can be eliminated.

Figure 7C:
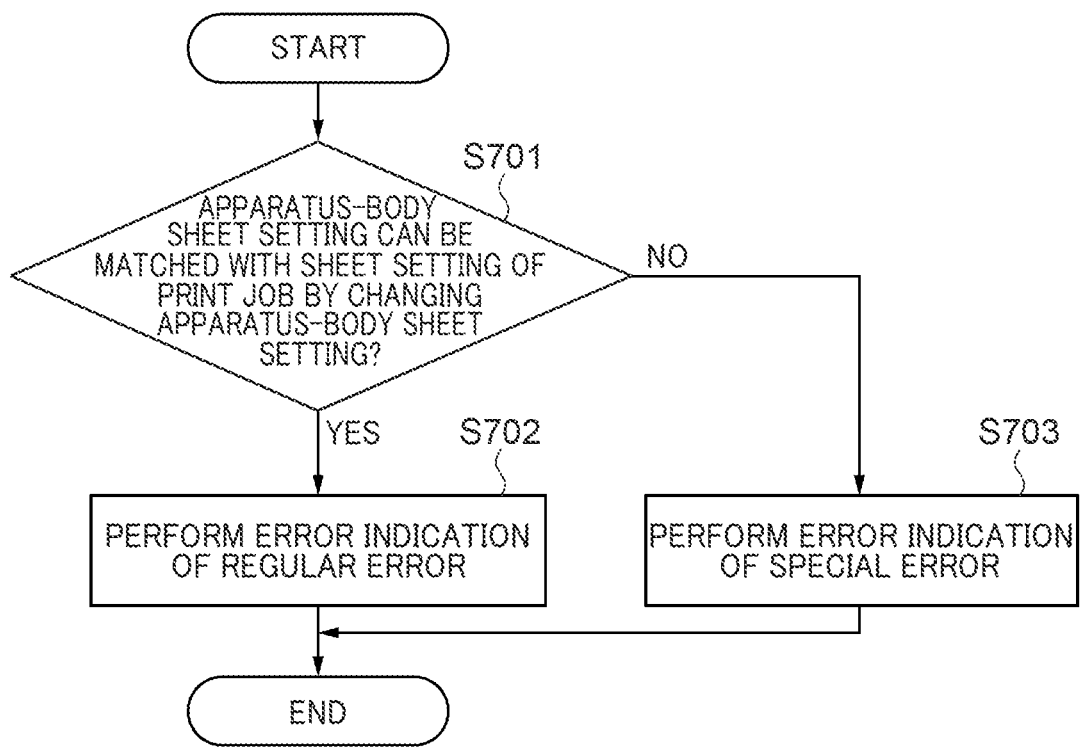
FIG. 7C is a flowchart showing error handling that is executed when a sheet size error occurs.

FIG. 7C is a flowchart showing an error handling that is executed when a sheet size error (a regular error or a special error) occurs. Each process (step) indicated by an S number in FIG. 7C is achieved when the CPU 301 loads a predetermined program stored in the program memory 303 into the work memory 305 and controls the operation of each unit of the image forming apparatus 100. The process of the flowchart is started when a mismatch between the sheet setting of the print job and the apparatus-body sheet setting is determined as a result of comparison of the sheet settings.

In S701, the CPU 301 determines whether the apparatus-body sheet setting can be matched with the sheet setting of the print job by operating the operation panel 318 (the hardkey group 319). When determining that the sheet settings can be matched (YES in S701), the CPU 301 executes a process in S702. When determining that the sheet settings cannot be matched (NO in S701), the CPU 301 executes a process in S703.

In S702, the CPU 301 performs an error indication (hereinafter referred to as a "first error indication") on the operation panel 318 to notify the user that a regular error is occurring, and then, finishes the process and waits for a user response. In S703, the CPU 301 performs an error indication (hereinafter referred to as a "second error indication") on the operation panel 318 to notify the user that a special error is occurring, and then, finishes the process and waits for a user response.

FIG. 7D shows examples of the first error indication and the second error indication. In the first error indication corresponding to a case where a regular error occurs, the error lamp 416 is blinked X times/second (X is an arbitrary natural number). At the same time, the sheet selection lamp of the sheet type corresponding to the current apparatus-body sheet setting is illuminated, and the sheet selection lamp corresponding to the sheet setting of the print job is blinked.

The user can cancel the regular error by pressing the sheet change button 411 a predetermined number of times to change the apparatus-body sheet setting such that the blinking sheet selection lamp transitions to the lighted state, thereby matching the respective sheet settings of the image forming apparatus 100 and the print job. When the regular error is removed, the error lamp 416 is extinguished. The user then exchanges the sheet as needed.

In the meantime, if the special error is occurring, the sheet selection lamp corresponding to the sheet setting of the print job cannot be blinked because there is no changeable sheet type. Also, even if the sheet change button 411 is pressed, the special error cannot be canceled. Therefore, the input from the sheet change button 411 is invalidated. The error lamp 416 is blinked Y times/second (Y is an arbitrary natural number different from X). In this case, the regular error and the special error can be clearly distinguished from each other by setting Y and X to different values. For example, the blink speed of the error lamp 416 for the special error is set faster than that for the regular error. When the special error occurs, it is necessary to cancel the execution of the print job in the host computer 308 or the like that is the transmission source of the print job. When the execution of the print job is canceled, the error lamp 416 is extinguished.

In this embodiment, the regular error and the special error are distinguished from each other by controlling lighting, blinking, and extinguishing of the sheet selection lamps 402 and by controlling the blink speed of the error lamp 416. However, the method of distinguishing these errors is not limited to this. For example, if the lighting color and blinking color of the error lamp 416 can be changed (for example, yellow and red), the regular error and the special error may be distinguished and represented by changing the lighting color and the blinking color.

As described above, in the first embodiment, when an error in which the sheet setting of the print job and the sheet setting in the image forming apparatus do not match occurs, different notifications are given to the user depending on whether the image forming apparatus can handle the error or cannot handle the error. As a result, the user can easily take measures according to the contents of the notification, and the user ability is improved.

A second embodiment of the present invention will now be described. In the first embodiment, the sheet type of the standard registration box and the sheet type of the variable registration box are treated equally. In contrast, in the second embodiment, a unique process is performed when the sheet size error occurs only when the variable registration box is selected for the sheet setting in the image forming apparatus 100.

Figure 8:
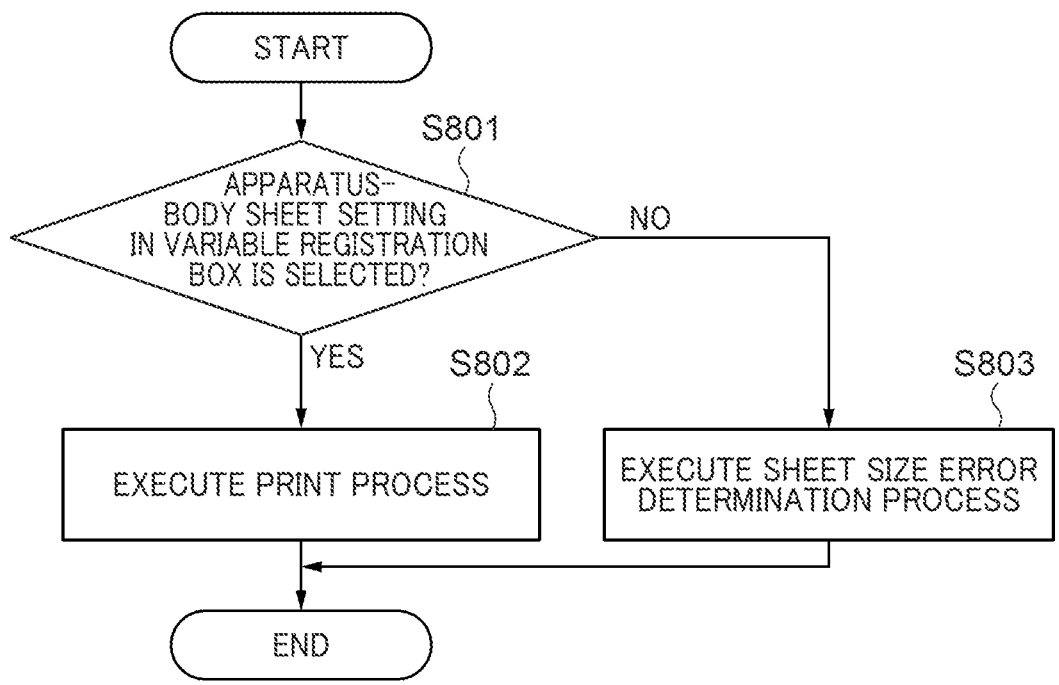
FIG. 8 is a flowchart showing a process according to a sheet size error in a second embodiment.

FIG. 8 is a flowchart showing an error determination process in the second embodiment. Each process (step) indicated by an S number in FIG. 8 is achieved when the CPU 301 loads a predetermined program stored in the program memory 303 into the work memory 305 and controls the operation of each unit of the image forming apparatus 100. The process of this flowchart is triggered by the image forming apparatus 100 receiving the print job from the external device.

In S801, the CPU 301 determines whether the sheet setting of the image forming apparatus 100 in the variable registration box (the sheet type 4) is selected. When determining that the variable registration box is selected (YES in S801), the CPU 301 executes a process in S802. When determining that the variable registration box is not selected (standard registration box is selected) (NO in S801), the CPU 301 executes a process in S803.

In S802, the CPU 301 executes the print process without performing error determination. That is, even if a generation condition of a sheet size error is satisfied, no sheet size error is generated and the print process is forcibly executed. After that, this processing is finished. In the meantime, the CPU 301 performs a sheet size error determination process in S803 and then finishes this process. When it is determined that sheet size error has occurred in S803, for example, the same error indication as the first error indication in the first embodiment (however, it does not necessarily mean that a regular error has occurred in the first embodiment) is performed. As described above, in the second embodiment, when the apparatus-body sheet setting is the variable registration box (sheet type 4), the print job can be completed without performing a complicated notification to the user.

In the sheet size error determination process in S803, error indication and countermeasure control may be performed as described below in cases corresponding to the regular error and the special error in the first embodiment. That is, when the error corresponds to the regular error in the first embodiment, the first error indication as with that in S702 is performed. In addition, there shall be the following two methods for the error indication corresponding to the special error in the first embodiment, and one of them is set to the apparatus body. In a first method, the second error indication is performed as with that in S703 in the first embodiment. In a second method, a user is prompted to change the apparatus-body sheet setting to the variable registration box and the print process is forcibly performed after the change. In the second method, the sheet change button 411 is enabled, the sheet selection lamp corresponding to the current apparatus-body sheet setting is illuminated, and the sheet selection lamp corresponding to the variable registration box (sheet type 4) is blinked. When the user operates the sheet change button 411 to change the apparatus-body sheet setting to the variable registration box, the print process is forcibly performed. As a result, the error status of the apparatus body is canceled.

Although the present invention has been described in detail on the basis of the suitable embodiments, the present invention is not limited to these specific embodiments, and various configurations that do not deviate from the scope of the present invention are also included in the present invention. Furthermore, each of the above-mentioned embodiments merely represents one example of the present invention, and the embodiments may be combined as appropriate. Although the sheet size is taken up as the sheet type in the above-described embodiments, the sheet type is not limited thereto. For example, the sheet type may be basis weight, paper thickness, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-118074, filed Jul. 25, 2022, which is hereby incorporated by reference herein in its entirety.

What is claimed is:

1. An image forming apparatus comprising:
a registration unit configured to register any of a plurality of sheet types including a first sheet type and a second sheet type with respect to a sheet unit for setting sheets;
a print unit configured to print an image on a sheet stored in the sheet unit based on a received print instruction; and
a notification unit configured to perform predetermined notification based on a sheet type included in the print instruction and the sheet type registered by the registration unit,
wherein the first sheet type is registered by the registration unit based on a user operation through an operation unit of the image forming apparatus, and the second sheet type is registered by the registration unit based on a user operation through the operation unit and a user operation through an external device that communicates with the image forming apparatus,
wherein the notification unit performs notification by a first notification method in a case where a sheet type other than the first sheet type is registered by the registration unit and a print instruction using the first sheet type is received, and
wherein the notification unit performs notification by a second notification method different from the first notification method in a case where a sheet type other than the second sheet type is registered by the registration unit and a print instruction using the second sheet type is received.

2. The image forming apparatus according to claim 1, wherein the first sheet type is registered without requiring a user operation through the external device.

3. The image forming apparatus according to claim 1, wherein the operation unit includes a plurality of light emission units respectively provided for the plurality of sheet types, and
wherein each of the plurality of light emission units emits light in different modes before and after completion of selection of a sheet type to be registered in the sheet unit through the operation unit.

4. The image forming apparatus according to claim 1, wherein a control unit included in the image forming apparatus controls so that a sheet type cannot be changed by the registration unit in a case where the sheet type registered for the sheet unit by the registration unit cannot be matched with the sheet type included in the print instruction.

5. The image forming apparatus according to claim 1, wherein a control unit included in the image forming apparatus controls the print unit to print an image based on the print instruction without performing the predetermined notification by the notification unit in a case where the second sheet type is registered by the registration unit.

6. The image forming apparatus according to claim 1, wherein the notification unit performs the predetermined notification by using a light emission unit; and
wherein a first blink speed of the light emission unit in the first notification method is different from a second blink speed of the light emission unit in the second notification method.

7. The image forming apparatus according to claim 6, wherein the second blink speed is faster than the first blink speed.

8. The image forming apparatus according to claim 1, wherein the plurality of sheet types are sheet sizes.

9. The image forming apparatus according to claim 1, wherein a detection unit for automatically detecting the size of the sheet contained in the sheet unit is not provided.

10. A control method for an image forming apparatus that includes a registration unit configured to register any of a plurality of sheet types with respect to a sheet unit for setting sheets and a print unit configured to print an image on a sheet set in the sheet unit based on a received print instruction, the control method comprising:
registering a first sheet type by the registration unit based on a user operation through an operation unit of the image forming apparatus;
registering a second sheet type by the registration unit based on a user operation through the operation unit and a user operation through an external device that communicates with the image forming apparatus;

performing notification by a first notification method in a case where a sheet type other than the first sheet type is registered by the registration unit and a print instruction using the first sheet type is received; and performing notification by a second notification method different from the first notification method in a case where a sheet type other than the second sheet type is registered by the registration unit and a print instruction using the second sheet type is received.

11. A non-transitory computer-readable storage medium storing a control program causing a computer to execute a control method for an image forming apparatus that includes a registration unit configured to register any of a plurality of sheet types with respect to a sheet unit for setting sheets and a print unit configured to print an image on a sheet set in the sheet unit based on a received print instruction, the control method comprising:

registering a first sheet type by the registration unit based on a user operation through an operation unit of the image forming apparatus;

registering a second sheet type by the registration unit based on a user operation through the operation unit and a user operation through an external device that communicates with the image forming apparatus;

performing notification by a first notification method in a case where a sheet type other than the first sheet type is registered by the registration unit and a print instruction using the first sheet type is received; and performing notification by a second notification method different from the first notification method in a case where a sheet type other than the second sheet type is registered by the registration unit and a print instruction using the second sheet type is received.

* * * * *